H. C. ATKINSON.
Combined Oven-Door and Roaster.
No. 216,132.          Patented June 3, 1879.
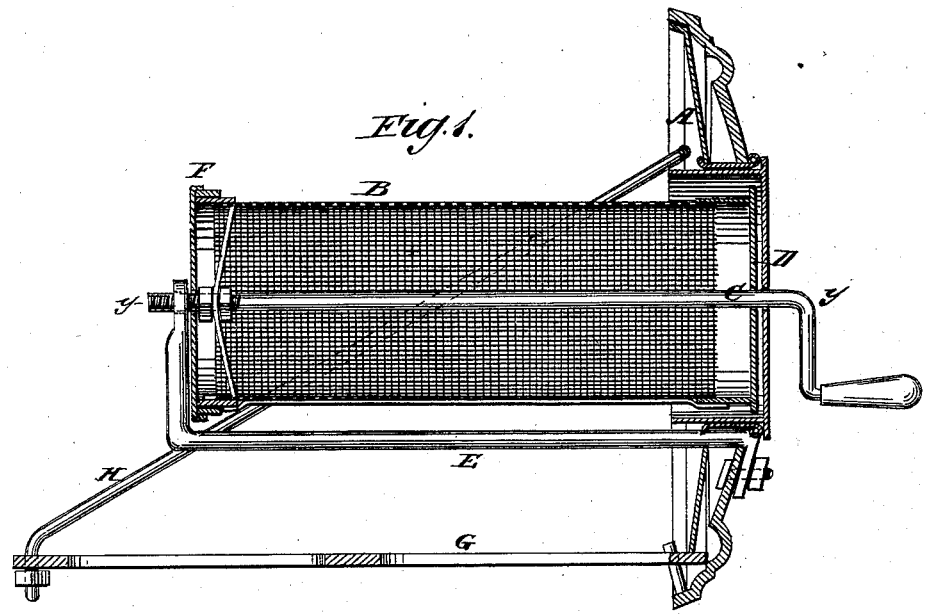
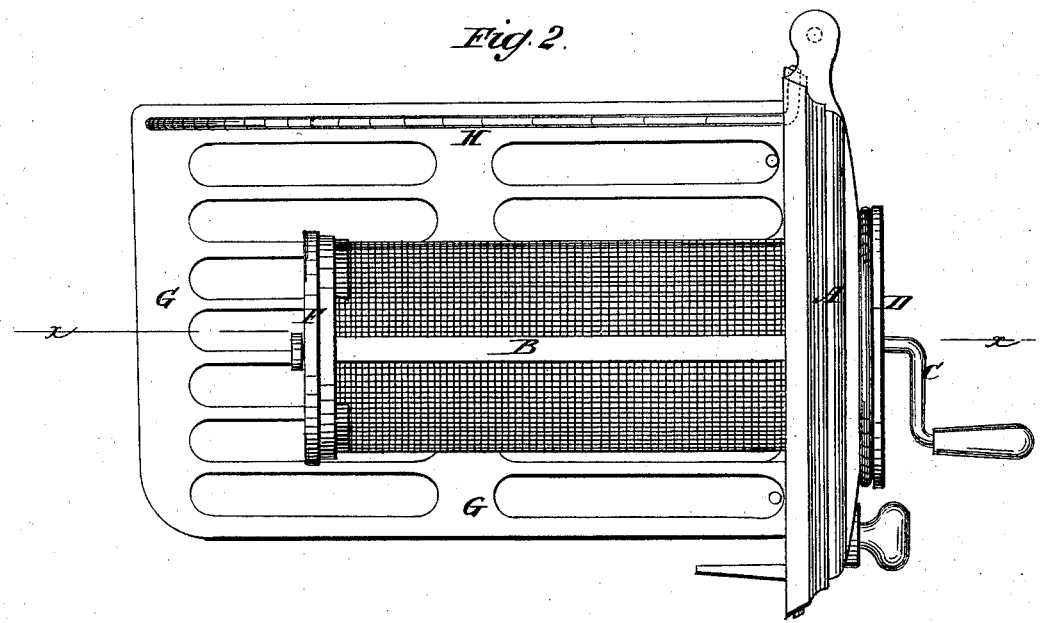
WITNESSES:
Francis McArdle
C. Sedgwick
INVENTOR:
H. C. Atkinson
BY Munn & Co
ATTORNEYS.

UNITED STATES PATENT OFFICE.

HENRY C. ATKINSON, OF FRANKLIN, KENTUCKY.

IMPROVEMENT IN COMBINED OVEN-DOOR AND ROASTER.

Specification forming part of Letters Patent No. 216,132, dated June 3, 1879; application filed January 9, 1879.

*To all whom it may concern:*

Be it known that I, HENRY C. ATKINSON, of Franklin, in the county of Simpson and State of Kentucky, have invented a new and Improved Combined Oven-Door and Roaster, of which the following is a specification.

Figure 1 is a vertical longitudinal section on line $x$ $x$, Fig. 2. Fig. 2 is a plan view of the cylinder and rack.

Similar letters of reference indicate corresponding parts.

This invention has for its object the attachment to the inside of an oven-door of an apparatus for roasting coffee, popping corn, &c., and one which may be advantageously used in roasting meats, baking bread, and for other purposes connected with the culinary art.

In the drawings, A represents an oven-door, to the inside of which is attached a wire cylinder, B, which is revolved by crank-rod C, passing through its longitudinal axis. One end of the crank-rod passes through and is supported by cap or register D, while the other end is supported by the bent rod E, which is attached to the oven-door.

Wishing to roast coffee or pop corn, one removes the cap F from the cylinder and introduces the coffee or corn; then, replacing the cap, inserts the cylinder through the opening in the oven-door and adjusts it in place; then, closing the door, revolves the cylinder with the crank until the work is accomplished.

The rod E, as well as the cylinder B and attachment, can readily be removed, and a meat-hook or spit substituted for the rod, on which may be placed a fowl or piece of meat for roasting, while a pan placed on rack G will catch the drippings therefrom.

The rack G, supported by rod H, is attached to the inside lower edge of the oven-door, about an eighth of an inch from the bottom of the oven, which distance admits of a circulation of hot air under whatever is cooking upon it.

When the oven-door is opened, the rack will swing out of the oven, when anything cooking upon it can be easily attended to.

The advantages arising from this arrangement will be readily understood by any cook or housekeeper.

When the cylinder B is removed, the opening in the door may be closed with a ventilator or register, which can be opened or closed at will.

I am aware that the use of a rack in connection with a door or a cylinder with attachments is not, broadly, new; but

What I claim as of my invention is—

The combination, with an oven-door, A, of the wire cylinder B, crank-rod C, cap D, and bent rod E, as and for the purpose specified.

HENRY CATE ATKINSON.

Witnesses:
JAS. W. WICKWARE,
A. P. HAMMOND.